E. A. JOHNSTON.
GEARING.
APPLICATION FILED FEB. 26, 1909.
989,712.
Patented Apr. 18, 1911.
2 SHEETS—SHEET 1.
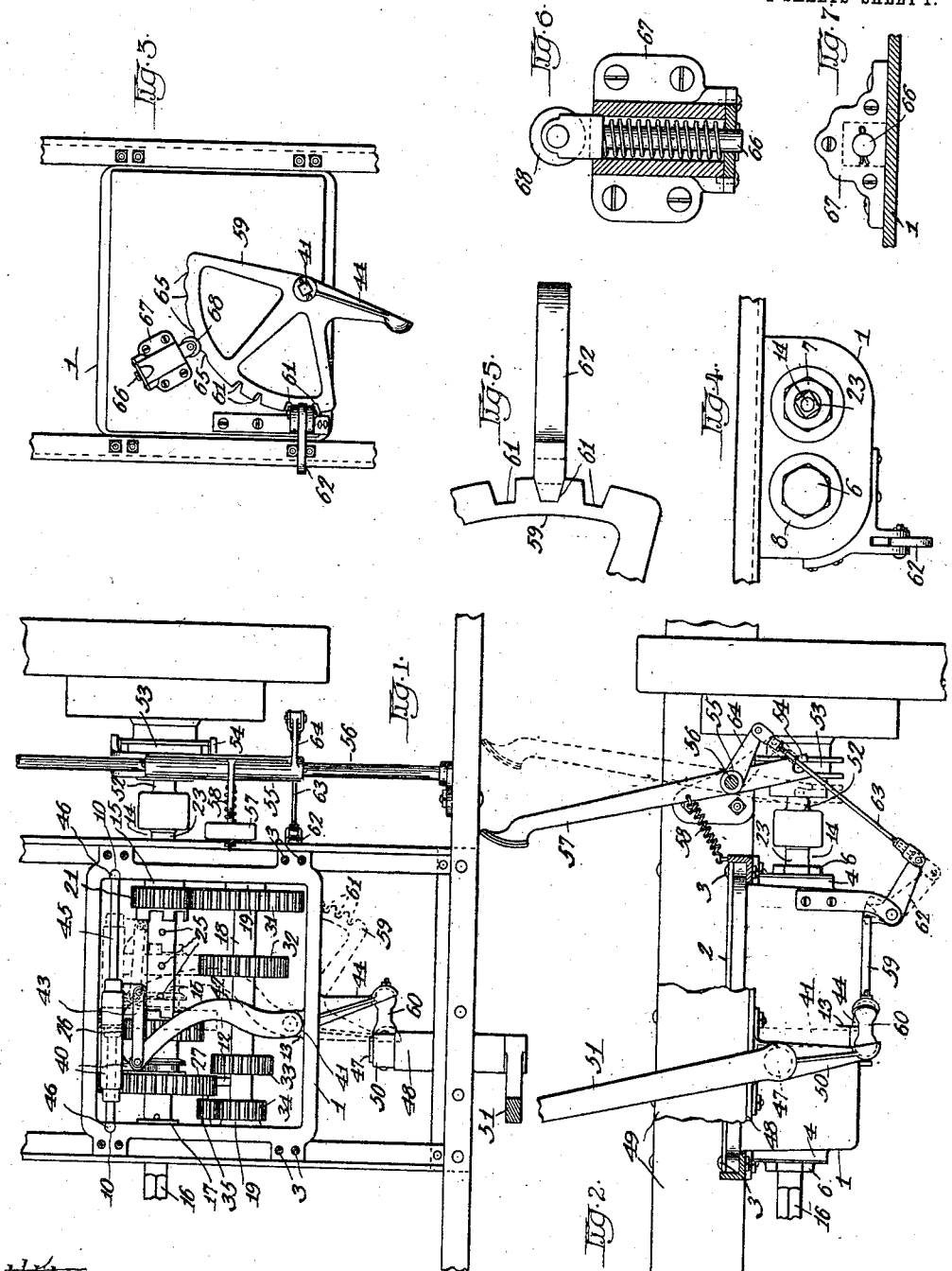
Witnesses:
F. W. Hoffmeister
W. M. Hofert
Inventor
Edward A. Johnston
By E. W. Burger
Attorney

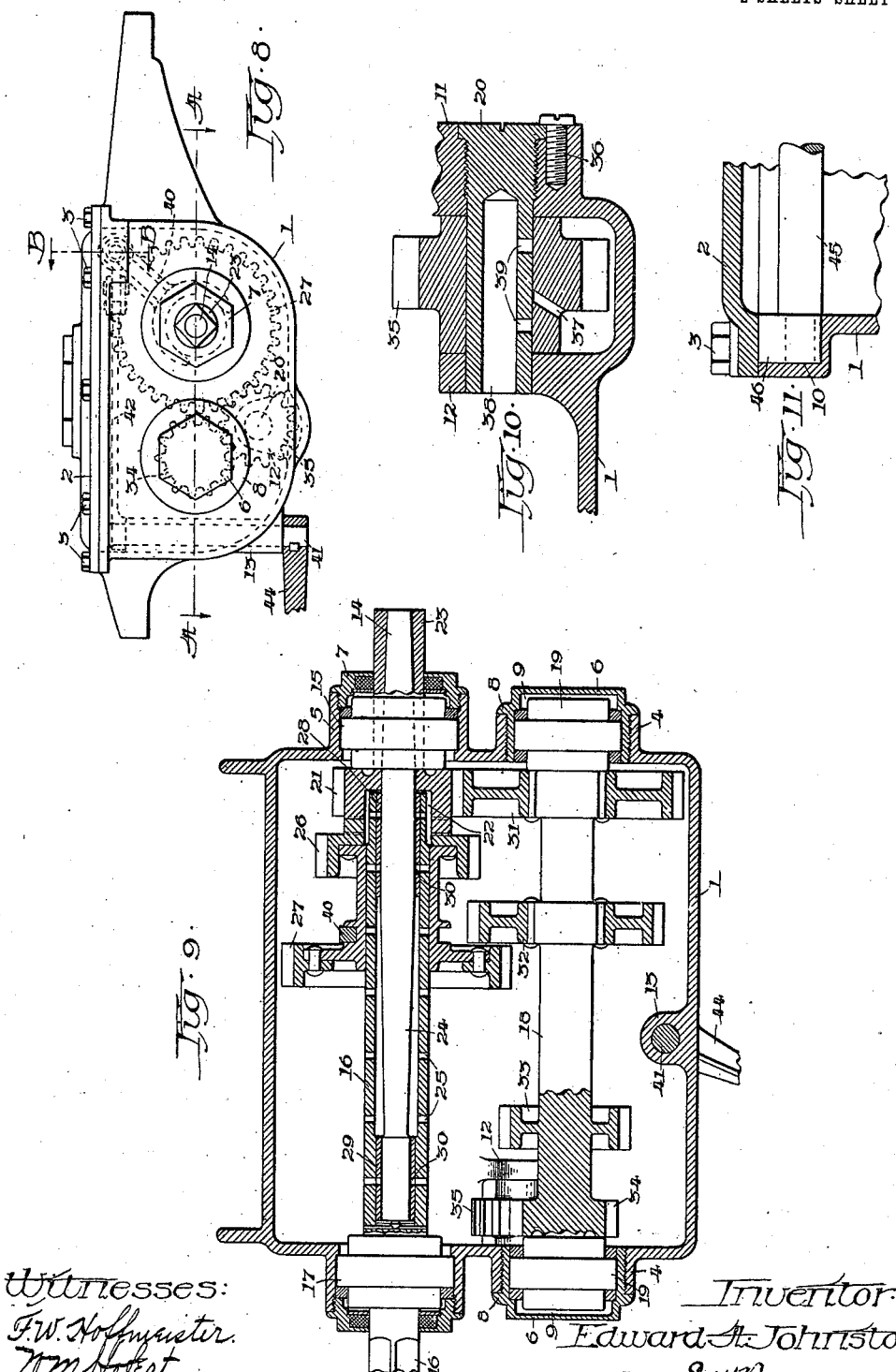

UNITED STATES PATENT OFFICE.

EDWARD ARTHUR JOHNSTON, OF AKRON, OHIO, ASSIGNOR TO INTERNATIONAL HARVESTER COMPANY, A CORPORATION OF NEW JERSEY.

GEARING.

989,712.   Specification of Letters Patent.   Patented Apr. 18, 1911.

Application filed February 26, 1909. Serial No. 480,141.

*To all whom it may concern:*

Be it known that I, EDWARD A. JOHNSTON, a citizen of the United States, residing at Akron, in the county of Summit and State of Ohio, have invented certain new and useful Improvements in Gearing, of which the following is a specification.

My invention relates to transmission gearing, and in particular to speed changing gearing when used in connection with automobile construction, and consists in means whereby the lever controlling mechanism for changing the speed of the driving elements is locked in its adjusted position when the motor is equipped with the transmission gearing, and cannot be manipulated by the operator so long as said driving elements are operatively connected, the object of my invention being to provide a locking mechanism of the kind indicated that will be positive in its action and so mounted that its operation will not be affected by the wear of the associated parts of the mechanism. This object is attained by means of the mechanism illustrated by the accompanying drawing, in which—

Figure 1 is a plan view of a transmission gearing embodying my invention; Fig. 2 is a side elevation of Fig. 1; Fig. 3 is a detached detail of part of the locking mechanism; Fig. 4 is an end view, partly in section, of Fig. 2, designed to illustrate the manner of mounting the gear locking detent; Fig. 5 is a detail showing the engagement of the locking detent with a notched sector; Fig. 6 is a detail of the brake mechanism in connection with the locking means; Fig. 7 is an elevation of Fig. 6. Fig. 8 is a rear end elevation of Fig. 1; Fig. 9 is a longitudinal section of Fig. 8 along line A—A; Fig. 10 is an enlarged sectional view, partly in elevation, illustrating one of the gears and contiguous parts; and Fig. 11 is an enlarged sectional view, partly in elevation, on line B—B of Fig. 8.

The gear locking mechanism of my invention is applicable to different forms of transmission gearing, but is designed in particular to be used in connection with a sliding gear mechanism such as is shown in Patent No. 819,334, May 1, 1906, A. T. Brown.

The same reference characters designate like parts throughout the several views.

1 represents a gear case having a removable top 2, secured by screws 3 to the side and end walls of the case. The opposing end walls of the case are each provided with integral internally threaded hubs 4, 5 below the top 2, the hubs 4 being closed by caps 6, and the hubs 5 being provided with axially perforated caps 7. Said caps 6 extend into the hubs 4 and are provided with external threads meshing with the internal threads of the hubs, and are also provided with annular shoulders 8 engaging the ends of the hubs, and with sockets 9 extending axially from the inner ends of the caps and having closed outer ends. The end walls of the case are also provided with channels 10 opening through the inner faces of said walls and through their upper edges opposed to the cover 2. One of the end walls of the case is formed with an internally threaded hub 11 (Fig. 10), and the bottom of the case is provided with an internal lug 12 formed with a bearing alined with the opening of the hub 11. The case is also provided with an upright journal bearing 13 extending from the bottom and terminating near the top 2, the opening of the bearing extending through the outer face of the bottom.

The power transmitting means includes a driving shaft 14 passed through the opening of one of the caps 7 and journaled in a bearing 15 within one of the hubs 5, a driven shaft 16 passed through the opening of the other cap 7 and journaled in a bearing 17 in the other cap 5, a countershaft 18, journaled in bearings 19, mounted in the sockets 9 of the caps 6, and a spindle 20 supported in the hub 11 and the lug 12. As illustrated in Fig. 9, the driving shaft 14 terminates near the bearing 17 for the driven shaft 16, and carries a gear 21, fixed thereto and provided with a socket 22 extending axially from its inner side, and with a hollow hub 23 which projects from its opposite side, encircles the portion of the shaft 14 within the bearing 15, and is journaled in the bearing 15. As will be obvious to those skilled in the art, the hub of the gear 21 is essentially a part of the shaft 14. A part 24 of the driving shaft 14, between the inner end thereof and the bearing 15, is formed of reduced diameter. The driven shaft 16, journaled in the bearing 17, is formed with a hollow portion encircling the inner end of the driving shaft 14 and extending into the socket 22 of the gear 21 and terminating near the bearing 15 for said driving shaft. The hollow portion of the driven shaft 16, which is preferably of angular cross section, is provided with transverse ducts 25 communicating with the interior thereof, and supports a pair of sliding gears 26 and 27, secured together, one of these gears having a clutch face for coacting with a corresponding clutch face on the gear 21. Bushings 28 and 29 are interposed between contiguous surfaces of the shafts 14 and 16 at opposite sides of the reduced part 24 of the shaft 14, are suitably fixed to the shaft 16, and are formed with transverse ducts 30 alined with some of the ducts 25.

The countershaft 18 is provided with suitable gears 31, 32, 33 and 34, of varying diameters, secured thereto, the gear 31 being engaged with the gear 21, and the gears 32 and 33 being detachably engaged, respectively, by the gears 26 and 27, and the gear 34 being engaged with a gear 35 mounted on the spindle 20. The shaft 18 is preferably of greater length than the distance between the opposing walls of the case 1, and the gear 34 on said shaft is of less diameter than the internal opening of the contiguous hub 4 in order that said shaft and gear may be moved axially in the hub for facilitating assembling of said parts in position.

The bearings 15, 17 and 19 are of any desirable construction, those illustrated being of a well-known type, including fixed external shells, revoluble internal rings, and antifriction rollers or balls between such shells and rings, and it is, therefore, unnecessary to further describe the same.

As shown in Fig. 10, the spindle 20 extends through the hub 11 into the bearing of the lug 12, and is formed with a head provided with peripheral threads meshing with the internal threads of said hub. A screw 36 engages the hub 11 and the head of the spindle 20 for locking the spindle in position. Lubrication of the spindle is facilitated by ducts 37 in the gear 35 leading from the exterior of said gear to the spindle 20, a lengthwise passage 38 in the spindle having one end closed and its opposite end opening through the end face of said spindle nearest the internal lug 12, and transverse ducts 39 extending through the periphery of the spindle from the passage 38.

The shifting mechanism for the sliding gears 26 and 27 includes a rectilinearly movable yoke 40, a rock shaft 41 journaled in bearing 13 and having its ends extending above and below said bearing, an arm 42 secured to the upper end of said rock shaft 41, a link 43 connecting the yoke 40 to the arm 42, and an arm 44 secured to the lower end of the rock shaft 41. The yoke 40 is movable along the guide rod 45, having its opposite ends supported in bearings 46, which are removably mounted in the channels 10 and are held in position by the cover 2.

Means for controlling the gear shifting mechanism includes a transversely arranged rock shaft 47 mounted in a bearing 48 secured to a frame member 49 forming part of the construction of an automobile, an arm 50 secured to the inner end of the shaft and adapted to operatively engage with arm 44, and a hand lever 51 secured to the opposite end of the rock shaft.

52 represents part of the crank shaft of an explosive engine which is connected with the driving shaft 14 by means including a clutch mechanism having a sliding member 53 controlled by a depending arm 54 integral with a sleeve 55 loosely mounted upon a transverse shaft 56, and 57 represents a foot lever, also integral with said sleeve and yieldingly held against movement in one direction by means of a tension spring 58 having one end secured to the lever and its opposite end to a fixed part of the frame.

For the purpose of preventing a manipulation of the hand lever 51 and its associated mechanism connecting it with the speed changing devices forming part of the transmission gear mechanism while the motor is operatively connected with the latter, there is provided a locking mechanism that connects the hand lever 51 with the foot lever 57, including a sector 59 integral with arm 44, that is connected with the lower end of arm 50 by means of a ball and socket joint 60. The sector is provided with notches 61 upon its under surface, and 62 represents a detent pivotally mounted upon the gear case and having one end adapted to engage with said notches and its opposite end connected with the sleeve 55 by means of a link 63 and an arm 64, the arm being an integral part of the sleeve. The sector is also provided with peripheral depressions 65, and 66 represents a spring-pressed plunger bolt mounted in a bracket 67 secured to the bottom of the gear case and arranged radially relative to the axis of the sector and having a roller 68 journaled upon its inner end and adapted to engage with the periphery of the sector and projected into the depressed portions thereof, which depressions are spaced apart a distance equal to that between the notches 61, whereby the plunger operates in a manner to automatically cause the notches to register with the detent when brought in proximity thereto.

What I claim as my invention and desire to secure by Letters Patent is:

A power transmission gearing including, in combination, a driving shaft, means for transmitting motion to said shaft including clutch devices, said clutch devices including controlling means, said means including a shaft, a sleeve mounted upon said shaft, said sleeve having depending arms and a foot lever, changeable speed gearing connected with said driving shaft, a lever mechanism adapted to control the position of said gearing including a vertical shaft having said lever secured to one end thereof, a notched sector secured to the opposite end of said shaft, a hand lever operatively connected with said sector, a detent adapted to engage with said notched sector, one of the depending arms forming part of said sleeve being connected with said clutch devices and the other arm with said detent.

EDWARD ARTHUR JOHNSTON.

Witnesses:
F. G. RUSSELL,
GEO. F. KLEIN.

Copies of this patent may be obtained for five cents each, by addressing the "Commissioner of Patents, Washington, D. C."